Patented May 18, 1954

2,678,898

UNITED STATES PATENT OFFICE 2,678,898

POLYCHLORO TETRAHYDRODICYCLOPENTADIENYL ESTERS

George Allen Buntin, Wilmington, Del., assignor to Hercules Powder Company, Wilmington, Del., a corporation of Delaware No Drawing. Application November 1, 1950, Serial No. 193,538

7 Claims. (Cl. 167—30)

This invention relates to new polychloro esters and, more particularly, to chlorinated esters of hydroxydihydrodicyclopentadiene and to insecticidal compositions containing these new products as the toxic ingredient.

It is known that esters of hydroxydihydrodicyclopentadiene may be obtained by the addition of a carboxylic acid to one of the double bonds of dicyclopentadiene. In the case of organic acids having low ionization constants, this reaction is usually carried out in the presence of an acidic catalyst.

Now in accordance with this invention, it has been discovered that esters of hydroxydihydrodicyclopentadiene may be chlorinated to prepare polychloro tetrahydrodicyclopentadienyl acylates containing in the tetrahydrodicyclopentadienyl radical an amount of chlorine equal to at least 45% of the total molecular weight of the compound and that compositions containing these polychloro esters have a high degree of insecticidal activity.

The following examples illustrate the preparation of the new polychloro tetrahydrodicyclopentadienyl acylates in accordance with this invention and the insecticidal activity of compositions containing them as the toxic ingredient. All parts and percentages are by weight unless otherwise indicated.

Example I

A mixture of 500 parts of dicyclopentadiene and 300 parts of chloroacetic acid was agitated and heated to 80° to 100° C. for 10 hours. The reaction mixture was cooled, diluted with 1000 parts of petroleum ether, washed with water until free of acid, and finally dried over anhydrous sodium sulfate. The petroleum ether solution was subjected to distillation under reduced pressure and 190 parts of the product was collected at 112° to 116° C. at 0.3 mm. pressure. On analysis, it was found to contain 14.9% chlorine (calc. 15.6%).

One hundred ninety parts of the above dihydrodicyclopentadienyl chloroacetate was dissolved in 600 parts of carbon tetrachloride. Chlorine was passed into the agitated solution in the presence of ultraviolet light, the temperature being kept below 30° C. during the chlorination. Samples were removed after 16 and 26 hours of chlorination. The carbon tetrachloride was removed from each of these samples by distillation under reduced pressure using a nitrogen sparge. The product in each case was a viscous, yellow liquid. The new polychloro tetrahydrocyclopentadienyl acetates were tested for their insecticidal activity against houseflies. In this and the following examples, the test for insecticidal activity against houseflies was made in the following manner and is referred to in this specification as the Bell Jar Method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30% to 55% kill and must be within the limits of 0.4 to 0.6 ml. After spraying the insecticide into the chamber, the flies were placed in an observation cage containing a wad of cotton wet with a dilute sugar solution. At the end of 24 hours, the number of dead and moribund flies was counted. All tests were carried out at 80° to 90° F. and 50% to 70% relative humidity.

The results of the analysis for chlorine content and of tests made on a 5% solution in deodorized kerosene of the above two polychloro esters are given in the following table:

The data are an average of tests made on each solution.

| Percent Chlorine | | 24-Hour Kill | O. T. I. Difference |
|---|---|---|---|
| Total | In Tetrahydrodicyclopentadienyl Radical | | |
| 57.8 | 49.5 | 90 | +46 |
| 60.8 | 53.2 | 98 | +54 |

Example II

A mixture of 150 parts of propionic acid, 180 parts of dicyclopentadiene and 18 parts of concentrated sulfuric acid was mixed whereupon an immediate exothermic reaction resulted. After the initial reaction, the agitated mixture was heated to 100° C. for 6 hours. The reaction mixture was then cooled, diluted with petroleum ether, washed with water until free of acid and finally dried over anhydrous sodium sulfate. The petroleum ether solution was subjected to distillation under reduced pressure and 205 parts of the dihydrodicyclopentadienyl propionate, which was a water-white liquid, was collected at 103°–108° C. at 1.5 mm. pressure.

One hundred twenty-five parts of the above ester was dissolved in 600 parts of carbon tetrachloride. Chlorine was passed into the agitated solution in the presence of ultraviolet light, the temperature rising to about 56° C. during the chlorination. The chlorination was continued for 15½ hours. The carbon tetrachloride was removed from the reaction mixture by distillation at 100° C. using a nitrogen sparge. The product was a very viscous, yellow liquid which contained 63.4% chlorine, all of which chlorine was in the tetrahydrodicyclopentadienyl radical. The polychloro tetrahydrodicyclopentadienyl propionate was tested for its insecticidal activity against houseflies by the Bell Jar Method. A 10% solution of this product in a 2:1 mixture of deodorized kerosene and acetone had a 24-hour kill of 70% which was equal to an O. T. I. difference of +23.

*Example III*

Dihydrodicyclopentadienyl trichloroacetate was prepared by mixing 136 parts of dicyclopentadiene with 164 parts of trichloroacetic acid. On mixing these two reagents an immediate exothermic reaction resulted. After the initial reaction had subsided, the agitated solution was heated to 100° C. for 6 hours. The reaction mixture was then cooled, diluted with petroleum ether, washed with water until free of acid and finally dried over anhydrous sodium sulfate. The petroleum ether solution was distilled under reduced pressure, 240 parts of a light yellow liquid being collected at 123°–126° C. at 1 mm. pressure. The dihydrodicyclopentadienyl trichloroacetate was analyzed and found to contain 35.3% chlorine (calc. 36.1%).

One hundred parts of the above ester was dissolved in 700 parts of carbon tetrachloride. Chlorine was passed into the agitated solution in the presence of ultraviolet light, the temperature rising to about 50° C. during the chlorination, which was continued for 11½ hours. The carbon tetrachloride was removed by heating to 100° C. under reduced pressure and using a nitrogen sparge. The polychloro tetrahydrodicyclopentadienyl trichloroacetate was a viscous, yellow liquid containing a total of 65.7% chlorine which is equal to 46.6% chlorine in the tetrahydrodicyclopentadienyl radical. When tested for its insecticidal activity against houseflies, a 10% solution of this material in a 2:1 mixture of deodorized kerosene and acetone was found to give a 24-hour kill of 70% which was equal to an O. T. I. difference of +17.

*Example IV*

Dihydrodicyclopentadienyl benzoate was prepared by heating a mixture of 132 parts of dicyclopentadiene, 122 parts of benzoic acid, 14 parts of concentrated sulfuric acid, and 50 parts of toluene (as a solvent) to 110° C. for 16 hours. After cooling, the reaction mixture was diluted with ether, washed with sodium bicarbonate until acid-free, and then dried over anhydrous sodium sulfate. The ether solution was distilled, 137 parts of a viscous, yellow liquid being obtained at 160°–165° C. at 2 mm. pressure.

One hundred eighteen parts of the above benzoate was dissolved in 850 parts of carbon tetrachloride. Chlorine was passed into the agitated solution in the presence of ultraviolet light, the temperature rising to about 50° C. during the chlorination. Samples were removed after 7 and 16 hours of chlorination. The carbon tetrachloride was removed from each of these samples by distillation under reduced pressure at 100° C. using a nitrogen sparge. The product in each case was a viscous, red liquid which cooled to a brittle, hard solid. These polychloro tetrahydrodicyclopentadienyl benzoates were tested for their insecticidal activity against houseflies by the Bell Jar Method. The results of the anaylsis for chlorine content and of tests made on 10% solutions in deodorized kerosene are given in the following table:

| Percent Chlorine | 24-Hour Kill | O. T. I. Difference |
|---|---|---|
| 48.4 | 95 | +46 |
| 55.1 | 89 | +39 |

The new polychloro tetrahydrodicyclopentadienyl acylates of this invention may be obtained by chlorinating an ester of hydroxydihydrodicyclopentadiene. The esters from which the polychloro derivatives are prepared in accordance with this invention may be any aliphatic, cycloaliphatic, or aromatic acid ester of hydroxydihydrodicyclopentadiene. These esters are readily prepared by the addition of an organic carboxylic acid to dicyclopentadiene. The acids which may be added to dicyclopentadiene to form the intermediates used to prepare the polychloro esters may be any aliphatic carboxylic acid, such as formic, acetic, propionic, butyric, isobutyric, chloroacetic, dichloroacetic, trichloroacetic, bromoacetic, chloropropionic, bromopropionic, acrylic, methacrylic, crotonic, etc., or aromatic acids, such as benzoic acid, toluic acid, etc., or alicyclic acids, such as tetrahydrobenzoic acid, tetrahydrotoluic acid, cyclopentane carboxylic acid, etc. The preferred esters are the esters of aliphatic acids having 2 to 4 carbon atoms and chlorine derivatives thereof having less than 3 chlorine atoms.

The reaction between the acid and the dicyclopentadiene is readily carried out by heating the two reactants together. In the case of the stronger acids, no catalyst need be used; however, in the case of the weak organic acids, the reaction is accelerated by the presence of an acid-acting condensation catalyst, such as sulfuric acid, alkyl or aryl sulfonic acids, boron trifluoride, or complexes thereof. The reaction may be carried out at room temperature in the case of the stronger acids and at higher temperatures in the case of weaker acids, up to a temperature of about 145° C. Solvents for the reaction may be used, if desired.

When an organic acid is added to dicyclopentadiene, it adds to the double bond in the six-membered ring, with saturation of the double bond. Simultaneously, a rearrangement is believed to occur, the molecule changing from an endo configuration to an exo configuration. While it is believed to be quite well established that the ester so prepared has an exo configuration, the configuration of the cyclic structure is not believed to be material to the present invention. In the chlorination of the ester, the configuration, whether it be endo or exo, is not believed to be disturbed. The insecticidal activity of the polychloro ester of this invention is not dependent upon the endo-exo configuration but is, instead, dependent upon the combination of per cent of chlorine in the dicyclopentadienyl radical together with the dicyclopentadiene structure (endo or exo) and the ester linkage. As used in this application and the claims appended, the term "polychloro tetrahydrodicyclopentadienyl acylates" is meant to include both the endo and exo forms.

The chlorination of the esters of hydroxydihydrodicyclopentadiene involves both addition chlorination and substitution chlorination. The contacting of the ester in the liquid phase with chlorine involves initially addition chlorination to form an ester of hydroxydichlorotetrahydrodicyclopentadiene of the formula represented by I or II. Further chlorination involves substitution chlorination whereby hydrogen atoms on the rings are substituted by chlorine. The resulting product of such chlorination is a mixture of isomers varying slightly with the temperature of chlorination. Due to the random substitution, such a mixture will contain small amounts of all of the possible isomers. Such a product of chlorination is expressed by Formula III or IV.

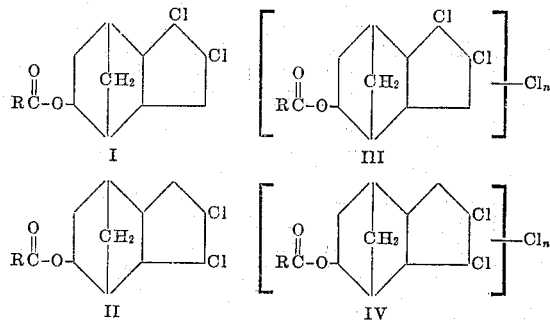

In Formulas III and IV, $n$ represents the number of chlorine atoms in the molecule. Thus, the products of this invention having a chlorine content of about 45% to about 75% chlorine obtained by chlorination of the esters of hydroxydihydrodicyclopentadiene will correspond to Formula III or IV in which $n$ is an integer from about 3 to about 12.

represents the radicals of the acids mentioned above and their chlorine derivatives. Similar products are obtained in the chlorination of esters of hydroxydichlorodihydrodicyclopentadiene.

In the chlorination of the dihydrodicyclopentadienyl acylates with chlorine, the chlorine enters the dihydrodicyclopentadienyl radical in preference to the acid portion of the molecule. The first mole of chlorine adds to the double bond of the cyclopenteno group and further chlorination then results in the substitution of chlorine for hydrogen in the tetrahydrodicyclopentadienyl radical. That this is the case has been proved by hydrolyzing the chlorinated ester and identifying the acid formed. It was found that the acid portion of the ester contained no more chlorine than was already present before chlorination. For example, hydrolysis of the polychloro tetrahydrodicyclopentadienyl monochloroacetate of Example I yielded monochloroacetic acid and no di- or tri-chloroacetic acid, as would be expected if the acid portion of the ester had been chlorinated. Thus, the polychloro tetrahydrodicyclopentadienyl acylates contain chlorine in the alcohol radical which is in addition to any chlorine that may be present in the acid portion of the ester.

The polychloro tetrahydrodicyclopentadienyl acylates in accordance with this invention are defined as containing chlorine in the tetrahydrodicyclopentadienyl radical, which chlorine is present in an amount equal to at least 45% of the total molecular weight of the compound. In the case of the polychloro tetrahydrodicyclopentadienyl acetates and propionates, this corresponds to about five chlorine atoms in the tetrahydrodicyclopentadienyl radical. In those esters in which the acid portion has a higher molecular weight, as, for example, in the benzoic or trichloroacetic acid esters of Examples III and IV, a larger number of chlorine atoms are required to equal 45% of the total molecular weight; i. e., 6 and 7, respectively, in these two instances.

The polychloro tetrahydrodicyclopentadienyl acylates are prepared by chlorination of the esters of hydroxytetrahydrodicyclopentadiene or chlorine derivative thereof at a temperature at which chlorination will take place but below the decomposition point of the product. Most polychloro tetrahydrodicyclopentadienyl acylates tend to decompose at their boiling point and the chlorination is, therefore, carried out below the boiling temperature of the material being chlorinated. The temperature of chlorination is generally kept below about 150° C. and is ordinarily carried out above 0° C., since at lower temperatures the rate of chlorination is impractically slow. The usual range of chlorination temperature is 50° C. to about 100° C. While initial stages of chlorination, particularly the stage of addition chlorination, may be carried out at low temperatures, the final stages of chlorination must be carried out in the range above 50° C. in order to reach a sufficiently high chlorine content to reach the desired toxicity.

The chlorination may be carried out in the presence or absence of catalysts but the reaction rate is impractically slow, especially toward the end of the chlorination, in the absence of catalysts and catalysts are, therefore, generally used for practical operation. Light is one of the most satisfactory catalysts and this is preferably actinic light. It acts by accelerating the formation of free radicals. Other catalysts may also be used by adding them to the chlorination mixture either at the beginning, during the course of, or toward the end of the chlorination process. As catalysts, one may use free radical formers such as lead alkyls and organic peroxides including peroxy acids and peroxy anhydrides. Only a catalytic amount of catalyst is needed and, if used up in the process, more will be added as required. More than a catalytic amount will not ordinarily be added at one time since better control is obtained by using only as much as is necessary for attaining the desired rate of chlorination. The preferred catalysts are the organic peroxides, particularly benzoyl peroxide or acetyl peroxide. The amount of catalyst used in the chlorination will ordinarily be within the range of about 0.001 to 5% based upon the chlorination mixture.

The chlorination is generally carried out in the liquid state. For instance, a volatile chlorinated solvent such as methylene chloride, chloroform, carbon tetrachloride, ethylene chloride, trichloroethane, tetrachloroethane, or pentachloroethane is generally used in order to maintain the liquid state and to reduce the viscosity sufficiently for good contact. Any well-known means of contacting the chlorine with the dihydrodicyclopentadienyl acylate or chloroderivative thereof may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control.

When a solvent is used, the amount ordinarily is kept below about 20 volumes per volume of dihydrodicyclopentadienyl acylate or chloroderivative being chlorinated and is generally within the range of 1-5 volumes.

The polychloro tetrahydrodicylopentadienyl acylate is readily purified and freed of catalysts by washing with water until sufficiently free of hydrochloric acid and then washing with mild alkali until neutral. The catalysts are ordinarily completely removed by this procedure. After purification, the solvent is removed by distillation, preferably under reduced pressure.

The products of chlorination of the dihydrodicyclopentadienyl acylates or chloroderivatives thereof when chlorinated in the above-designated temperature range still have the same carbon skeleton or ring system of the dicyclopentadienyl or tetrahydrodicyclopentadienyl radical.

The new polychloro tetrahydrodicyclopentadienyl acylates of this invention have been found to possess valuable properties as insecticidal toxicants. The surprising discovery has been made that, in order for these new compounds to possess such insecticidal activity, it is necessary that they contain an amount of chlorine in the tetrahydrodicyclopentadienyl portion of the molecule which is equal to at least about 45% of the total molecular weight and, preferably is from about 45% to about 75% of the total molecular weight. That the insecticidal activity is related to the amount of chlorine in the tetrahydrodicyclopentadienyl radical and not to the total chlorine content of the molecule may be seen with reference to the foregoing examples. In Example III, dihydrodicyclopentadienyl trichloroacetate is chlorinated. This compound itself has no insecticidal activity nor has the chlorine addition product of this compound; i. e., dichlorotetrahydrodicyclopentadienyl trichloroacetate. It is not until the compound contains a total chlorine content of about 65% (about 10 chlorine atoms) which is equal to about 45% chlorine or about 7 chlorine atoms in the tetrahydrodicyclopentadienyl radical, that it is found to have insecticidal activity. On the other hand, tetrahydrodicyclopentadienyl propionate, which contains no chlorine in the acid radical (Example II) exhibits insecticidal activity at a chlorine content of 45%, about 5 chlorine atoms, and tetrahydrodicyclopentadienyl monochloroacetate exhibits insecticidal activity at a total chlorine content of about 54%, which is equal to a chlorine content in the alcohol radical of 45% or about 5 chlorine atoms. Thus, it may be seen that it is the chlorine content of the tetrahydrodicyclopentadienyl radical which is critical, rather than the total chlorine content of the molecule, and that for insecticidal activity to be exhibited this must amount to at least 45% of the total molecular weight regardless of any chlorine atoms which may be present in the acid radical of the ester.

The insecticidal compositions of this invention are produced by admixing the polychloro tetrahydrodicyclopentadienyl acylates having a chlorine content within the range of about 45% to about 75% with a suitable adjuvant which is an inert material to facilitate the mechanical distribution of the polychloro tetrahydrodicyclopentadienyl acylate toxicant. Inert materials to facilitate the mechanical distribution of the toxicant are added for the purposes outlined in Frear (Chemistry of Insecticides, Fungicides, and Herbicides by Donald E. H. Frear, Second Edition, 1948, page 5) to form sprays, dusts, and aerosols from the polychloro tetrahydrodicyclopentadienyl acylate. Surface-active dispersing agents are used in admixture with the polychloro tetrahydrodicyclopentadienyl acylate to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed in Chemistry of Insecticides, Fungicides, and Herbicides (l. c., pages 280-287) for use with known insecticides and includes soaps of resin, alginic, and fatty acids and alkali metals or alkali amines or ammonia, saponins, gelatins, milk, soluble casein, flour and soluble proteins thereof, sulfite lye, lignin pitch, sulfiite liquor, long-chain fatty alcohols having 12-18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, and bentonite, and related hydrated aluminum silicates having the property of forming a colloidal gel. Among the other surface-active dispersing agents, which are useful in the compositions of this invention are the omega-substituted polyethylene glycols of relatively long-chain length, particularly those in which the omega substitutent is aryl, alkyl, or acyl. Compositions of the polychloro tetrahydrodicyclopentadienyl acylate toxic material and surface-active dispersing agent will in some instances have more than one surface-active dispersing agent for a particular type of utility, or in addition to a surface-active dispersing dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus, the polychloro tetrahydrodicyclopentadienyl acylate mixtures admixed with these inert materials which facilitate the mechanical distribution of the polychloro tetrahydrodicyclopentadienyl acylate in accordance with this invention are those containing the above-listed surface-active dispersing agents and hydrocarbon solvent dispersing agents.

The amount of polychloro tetrahydrodicyclopentadienyl acylate in the composition with the inert material which facilitates the mechanical distribution of the toxicant will depend upon the type of inert material and the use to which it is to be put. The compositions will generally contain less than about 30% polychloro tetrahydrodicyclopentadienyl acylate. Agricultural dusts may contain 40-60% polychloro tetrahydrodicyclopentadienyl acylate as concentrates and will generally contain 10-30% polychloro tetrahydrodicyclopentadienyl acylate in the form as used. Household sprays will contain from 0.1 to 10% polychloro tetrahydrodicyclopentadienyl acylate, preferably about 2.5% in deodorized kerosene but concentrates may contain 25-90% polychloro tetrahydrodicyclopentadienyl acylate. Agricultural sprays will, likewise, contain 0.1 to 10% of the polychloro tetrahydrodicyclopentadienyl acylate. Aqueous emulsions will contain sufficient surface-active dispersing agent to maintain an emulsion of the polychloro tetrahydrodicyclopentadienyl acylate during the spraying process. Concentrates from which emulsions are made may contain 25-90% polychloro tetrahydrodicyclopentadienyl acylate along with the surface-active dispersing agent.

For many purposes it may be desirable to use the polychloro tetrahydrodicyclopentadienyl acylate in combination with other insecticidal toxicants. Many toxicants have a very high knockdown in relatively dilute solutions, but higher concentrations must be used in order to obtain the desired degree of kill. Due to the very high degree of killing power which the polychloro tetrahydrodicyclopentadienyl acylate possesses, this compound may be added to such toxicants, thereby enabling the use of much more dilute solutions than would otherwise be possible. Toxicants with which this polychloro tetrahydrodicyclopentadienyl acylate may be combined include such compounds as rotenone, pyrethrum, and organic thiocyanates such as alkyl thiocyanates, thiocyanoethers such as β-butoxy-β'-thiocyanoethyl ether, and terpene thiocyanoacylates such as isobornyl thiocyanoacetate, fenchyl thiocyanoacetate, isobornyl α-thiocyanopropionate, etc.

The insecticidal compositions of this invention are useful in combatting flies, mosquitoes, roaches, moths, carpet beetles, bedbugs, boll weevils, boll worms, army worms, grasshoppers, and many other pests.

This application is a continuation-in-part of application Serial Number 780,103, filed October 15, 1947, now abandoned.

What I claim and desire to protect by Letters Patent is:

1. A polychloro tetrahydrodicyclopentadienyl acylate containing at least 45% chlorine by weight in the tetrahydrodicyclopentadienyl radical and 45% to 75% chlorine by weight in toto, obtained by chlorinating with chlorine gas at a temperature within the range of about 0° C.–150° C. an acetic ester of hydroxydihydrodicyclopentadiene.

2. A polychloro tetrahydrodicyclopentadienyl acylate containing at least 45% chlorine by weight in the tetrahydrodicyclopentadienyl radical and 45% to 75% chlorine by weight in toto, obtained by chlorinating with chlorine gas at a temperature within the range of about 0° C.–150° C. a chloroacetic ester of hydroxydihydrodicyclopentadiene.

3. An insecticidal composition comprising the product of claim 1 and an insecticidal adjuvant as a carrier therefor.

4. An insecticidal composition comprising the product of claim 2 and an insecticidal adjuvant as a carrier therefor.

5. A polychloro tetrahydrodicyclopentadienyl acylate containing at least 45% chlorine by weight in the tetrahydrodicyclopentadienyl radical and 45% to 75% chlorine by weight in toto, obtained by chlorinating with chlorine gas at a temperature within the range of about 0° C.–150° C. monochloroacetic ester of hydroxydihydrodicyclopentadiene.

6. A polychloro tetrahydrodicyclopentadienyl acylate containing at least 45% chlorine by weight in the tetrahydrodicyclopentadienyl radical and 45% to 75% chlorine by weight in toto, obtained by chlorinating with chlorine gas at a temperature within the range of about 0° C.–150° C. dichloroacetic ester of hydroxydihydrodicyclopentadiene.

7. A polychloro tetrahydrodicyclopentadienyl acylate containing at least 45% chlorine by weight in the tetrahydrodicyclopentadienyl radical and 45% to 75% chlorine by weight in toto, obtained by chlorinating with chlorine gas at a temperature within the range of about 0° C.–150° C. trichloroacetic ester of hydroxydihydrodicyclopentadiene.

References Cited in the file of this patent

UNITED STATES PATENTS

| Number | Name | Date |
|---|---|---|
| 2,382,038 | Bruson | Aug. 14, 1945 |
| 2,394,584 | Bruson | Feb. 12, 1946 |
| 2,395,452 | Bruson | Feb. 26, 1946 |
| 2,414,089 | Bruson | Jan. 14, 1947 |
| 2,528,655 | Herzfeld | Nov. 7, 1950 |

OTHER REFERENCES

Bruson et al., Journal Amer. Chem. Soc. 67, 1178–80 (1945).

Kearns et al., J. Econ. Entomology, vol. 38, pages 661–668 (1945).

Prill, Jour. Amer. Chem. Soc. vol. 69, pages 62–63 (1947).

Plummer, Dow Diamond, vol. 10, No. 4, pages 1–2 (July 1947).

Knipling, Soap and Sanitary Chemicals, pages 127–131 (July 1947).

Bussart et al., Soap and Sanitary Chemicals, pages 126–128 (August 1948).